United States Patent
Kodama et al.

(10) Patent No.: US 8,864,246 B2
(45) Date of Patent: Oct. 21, 2014

(54) VEHICLE BRAKE HYDRAULIC PRESSURE CONTROL APPARATUS

(75) Inventors: Takuro Kodama, Ueda (JP); Motoyasu Nakamura, Ueda (JP)

(73) Assignee: Nissin Kogyo Co., Ltd., Nagano (JP)

( * ) Notice: Subject to any disclaimer, the term of this patent is extended or adjusted under 35 U.S.C. 154(b) by 123 days.

(21) Appl. No.: 13/422,351

(22) Filed: Mar. 16, 2012

(65) Prior Publication Data

US 2012/0241036 A1 Sep. 27, 2012

(30) Foreign Application Priority Data

Mar. 25, 2011 (JP) ................................. 2011-068223

(51) Int. Cl.
*B60T 8/36* (2006.01)
(52) U.S. Cl.
CPC .............. *B60T 8/3685* (2013.01); *Y10S 303/10* (2013.01)
USPC .................................. 303/119.3; 303/DIG. 10
(58) Field of Classification Search
USPC .............................. 303/116.4, 119.3, DIG. 10
See application file for complete search history.

(56) References Cited

U.S. PATENT DOCUMENTS

| 5,697,678 | A * | 12/1997 | Huber .......................... 303/116.4 |
| 6,746,089 | B2 * | 6/2004 | Nakazawa ................. 303/116.4 |
| 6,932,439 | B2 * | 8/2005 | Nakazawa ............. 303/DIG. 10 |
| 2003/0070412 | A1 * | 4/2003 | Kusakari et al. ................. 57/120 |
| 2008/0272646 | A1 * | 11/2008 | Nakazawa et al. ............ 303/155 |
| 2010/0264723 | A1 | 10/2010 | Atsushi et al. |

FOREIGN PATENT DOCUMENTS

| EP | 2216219 A1 | 11/2010 |
| EP | 2269881 A2 | 5/2011 |
| JP | 8510196 A | 10/1996 |
| JP | 2002370635 A | 12/2002 |
| JP | 2008537067 A | 9/2008 |
| JP | 2009220802 A | 10/2009 |
| JP | 2010274904 A | 9/2010 |
| JP | 2011006033 | 1/2011 |

OTHER PUBLICATIONS

Japanese Patent Office Action for Application No. 2011-068223, drafting dated—Feb. 7, 2013, 5 pages.
Extended European Search Report for Application No. 12160971.3 dated Aug. 7, 2012.

* cited by examiner

*Primary Examiner* — Thomas J Williams
(74) *Attorney, Agent, or Firm* — Andrew M. Calderon; Roberts Mlotkowski Safran & Cole, P.C.

(57) ABSTRACT

A vehicle brake hydraulic pressure control apparatus includes: a control unit into which a base body, a motor and a controller housing are unitized and in which the motor and the controller housing are disposed so as to hold the base body therebetween; and a support device interposed between a vehicle body and the control unit. The support device has a lower mount member fixed to a lower surface of the base body that becomes vertical when the control unit is mounted on the vehicle body and a bracket that connects the lower mount member with the vehicle body. A center of gravity of the control unit is situated on the base body. The lower mount member is supported by the bracket to be situated at an intersection point between a vertical line passing through the center of gravity and the lower surface of the base body.

20 Claims, 8 Drawing Sheets

$t1 < t2$

VEHICLE BRAKE HYDRAULIC PRESSURE CONTROL APPARATUS

CROSS REFERENCE TO RELATED APPLICATION(S)

The present disclosure relates to the subject matters contained in Japanese Patent Application No. 2011-068223 filed on Mar. 25, 2011, which are incorporated herein by reference in its entirety.

FIELD

One or more embodiments of the present invention relate to a vehicle brake hydraulic pressure control apparatus.

BACKGROUND

There is known a vehicle brake hydraulic pressure control apparatus which is configured as a control unit by unitizing a substantially rectangular parallelepiped base body which incorporates hydraulic lines (flow paths of brake fluid) and various types of parts (electromagnetic valves and pumps) and a housing for a motor and a controller which are disposed so as to hold the base body therebetween. The vehicle brake hydraulic pressure control apparatus of this type is mounted on a vehicle body by being supported on a bracket with mount members so as to prevent the transmission of vibrations produced by the motor and brake fluid which pulsates thereto.

In vehicle brake hydraulic pressure control apparatuses, there are known vehicle brake hydraulic pressure control apparatus in which with a view to solving the problem with vibrations, a bracket having three mount members is interposed between a lower surface of a base body and a vehicle body to support the base body at three points so as to surround the center of gravity of the base body (refer to JP-A-2002-370635 and JP-W-8-510196).

In the vehicle brake hydraulic pressure control apparatuses disclosed in JP-A-2002-370635 and JP-W-8-510196, however, at least three mount members are necessary to surround the center of gravity of the control unit. In addition, the three mount members are disposed within the wide range between the lower surface of the base body and the vehicle body. Therefore, disposing the three mount members in the way described therein may lead to complexity and enlargement in shape of the bracket.

SUMMARY

In view of the above, one or more embodiments of the invention have been made, and an object thereof is to provide a vehicle brake hydraulic pressure control apparatus which can support a control unit while suppressing vibrations effectively with a required minimum number of mount members and which can realize a reduction in size of a bracket by simplifying the shape thereof.

According to a first aspect of the embodiments, there is provided a vehicle brake hydraulic pressure control apparatus including: a control unit into which a base body, a motor and a controller housing are unitized and in which the motor and the controller housing are disposed so as to hold the base body therebetween; and a support device interposed between a vehicle body and the control unit, wherein the support device has a lower mount member fixed to a lower surface of the base body that becomes vertical when the control unit is mounted on the vehicle body and a bracket that connects the lower mount member with the vehicle body, wherein a center of gravity of the control unit is situated on the base body, and wherein the lower mount member is supported by the bracket so as to be situated at an intersection point between a vertical line that passes through the center of gravity and the lower surface of the base body.

According to the vehicle brake hydraulic pressure control apparatus, the center of gravity of the control unit is designed to be situated on the base body, and the lower mount member is supported by the bracket so as to be situated at the intersection point between the vertical line which passes through the center of gravity and the lower surface of the base body. Therefore, the lower mount member can provide a stable support against the vibration sources such as the motor which generates vibrations and the brake fluid which produces pulsation, thereby making it possible to suppress the vibration of the control unit effectively.

In addition, the control unit can be supported by at least the single lower mount member while the vibration thereof being suppressed thereby effectively. Therefore, the shape of the bracket can be simplified, thereby making it possible to realize a reduction in size of the bracket.

According to a second aspect of the embodiments, there is provided a vehicle brake hydraulic pressure control apparatus including: a control unit into which a base body, a motor and a controller housing are unitized and in which the motor and the controller housing are disposed so as to hold the base body therebetween; and a support device interposed between a vehicle body and the control unit, wherein the support device has a lower mount member fixed to a lower surface of the base body that becomes vertical when the control unit is mounted on the vehicle body and a bracket that connects the lower mount member with the vehicle body, wherein the base body is configured so that a center of gravity of the control unit is situated on the base body by setting a distance from a motor mounting surface to a housing mounting surface larger than a size of a motor case in a direction of a motor shaft and smaller than a size of the housing in the direction of the motor shaft, and wherein the lower mount member is supported by the bracket so as to be situated at an intersection point between a vertical line that passes through the center of gravity and the lower surface of the base body.

According to the vehicle brake hydraulic pressure control apparatus, the center of gravity of the control unit is situated on the base body by setting the distance from the motor mounting surface to the housing mounting surface larger than the size of the motor case in the direction of the motor shaft and smaller than the size of the housing in the direction of the motor shaft. In addition, the lower mount member is supported by the bracket so as to be situated at the intersection point between the vertical line which passes through the center of gravity and the lower surface of the base body. Therefore, the same lower mount member can provide the stable support against the vibration sources such as the motor which generates vibrations and the brake fluid which produces pulsation, thereby making it possible to suppress the vibration of the control unit effectively.

The control unit can be supported by at least the single lower mount member while the vibration thereof being suppressed effectively. Therefore, the shape of the bracket can be simplified, thereby making it possible to realize a reduction in size of the bracket.

According to a third aspect of the embodiments, the lower mount member may support the base body only by itself so that an axis that passes through a center of the lower mount member coincides with a vertical line that passes through the center of gravity.

According to the vehicle brake hydraulic pressure control apparatus, the lower mount member supports the base body only by itself so that the axis which passes through the center of the lower mount member coincides with the vertical line which passes through the center of gravity. Therefore, the load of the control unit can be reliably borne by the single lower mount member, whereby the lower mount member 2A can preferably support the control unit while suppressing the vibration thereof effectively.

In addition, this contributes not only to the simplification of the shape of the bracket but also to the reduction in size of the bracket.

According to a fourth aspect of the embodiments, the support device may have a side mount member fixed to a lateral surface of the base body that is adjacent to the lower surface of the base body, and the side mount member may be fixed to the lateral surface from a direction that is horizontal and vertical to a motor shaft of the motor.

According to the vehicle brake hydraulic pressure control apparatus, the control unit can be supported by the lower mount member and the side mount member so that vibrations of the control unit in the vertical, horizontal direction and twisted directions thereof can be absorbed, thereby making it possible to support the control unit stably by a required minimum number of mount members.

According to a fifth aspect of the embodiments, the lower mount member and the side mount member may be fixed to the base body so that extensions of axes which respectively pass through centers of the lower mount member and the side mount member do not intersect each other.

According to the vehicle brake hydraulic pressure control apparatus, the lower mount member and the side mount member are disposed so as to be offset in the direction of the motor shaft. Therefore, the control unit can be supported by the lower and side mount members so that vibrations of the control unit in the twisted direction can absorbed further, thereby making it possible to support the control unit more stably by the required minimum number of mount members.

According to a fifth aspect of the embodiments, the base body may have a plurality of reservoirs which are opened to the lower surface of the base body and a sealing member which seals up the plurality of reservoirs, and the lower mount member may be fixed to the lower surface of the base body with the sealing member sandwiched between the lower mount member and the lower surface of the base body.

According to the vehicle brake hydraulic pressure control apparatus, the lower mount member is fixed to the lower surface of the base body with the sealing member. Therefore, the fixing configuration of the lower mount member can be simplified. This contributes to the reduction not only in the number of parts but also in the production costs. In addition, the plurality of reservoirs can be sealed up by the single (common) sealing member, and therefore, the number of parts can be reduced so as to reduce the production costs.

According to a seventh aspect of the embodiments, the sealing member may seal up the plurality of reservoirs, and the lower mount member may be disposed between the plurality of reservoirs.

According to the vehicle brake hydraulic pressure control apparatus, the lower mount member is disposed between the plurality of reservoirs which are sealed up by the sealing member. Therefore, the lower mount member can be fixed by making effective use of the dead space in the base body. In this way, the lower mount member can be mounted by making effective use of the dead space in the base body, and therefore, it is possible to realize the simplification of the shape and the reduction in size of the bracket.

According to an eighth aspect of the embodiments, the sealing member and the lower mount member may be fixed together with a screw that screws into a screw hole provided in the lower surface of the base body.

According to the vehicle brake hydraulic pressure control apparatus, the assemblage of the sealing member and the lower mount member to the base body becomes simple, and the production costs can be reduced by reducing the number of parts.

According to a ninth aspect of the embodiments, the sealing member may be a plate-shaped member, and a through hole through which the screw is inserted may be formed at a location thereon which corresponds to the screw hole, and, in the through hole, a seating face may be formed by folding a projection piece which is produced by performing a burring operation from one end thereof.

According to the vehicle brake hydraulic pressure control apparatus, in the through hole, the seating face is formed by folding the projection piece which is produced by performing the burring operation from the one end thereof. Therefore, the lower mount member can be fixed strongly and rigidly with the sealing member in the simple configuration, thereby making it possible to support the control unit more stably by the required minimum number of mount members.

According to the embodiments, the vehicle brake hydraulic pressure control apparatus can be obtained which can support the control unit while suppressing vibrations effectively with a required minimum number of mount members and which can realize a reduction in size of the bracket by simplifying the shape thereof.

BRIEF DESCRIPTION OF THE DRAWINGS

FIGS. 5A to 5E show diagrams showing the vehicle brake hydraulic pressure control apparatus, in which FIG. 5A is a plan view, FIG. 5B is a front view, FIG. 5C is a bottom view, FIG. 5D is a side view thereof and FIG. 5E is a bottom view of the base body.

DETAILED DESCRIPTION OF THE EMBODIMENTS

Hereinafter, a mode for carrying out the invention will be described in detail by reference to the accompanying drawings. In the following description, the description will be made based on front-to-rear, left-to-right and top-to-bottom directions shown in FIG. 1A. Here, the front-to-rear and left-to-right directions are directions following a horizontal direction of a vehicle brake hydraulic pressure control apparatus which is mounted on a vehicle body, not shown, and the top-to-bottom direction is a vertical direction thereof.

Figure 1A:
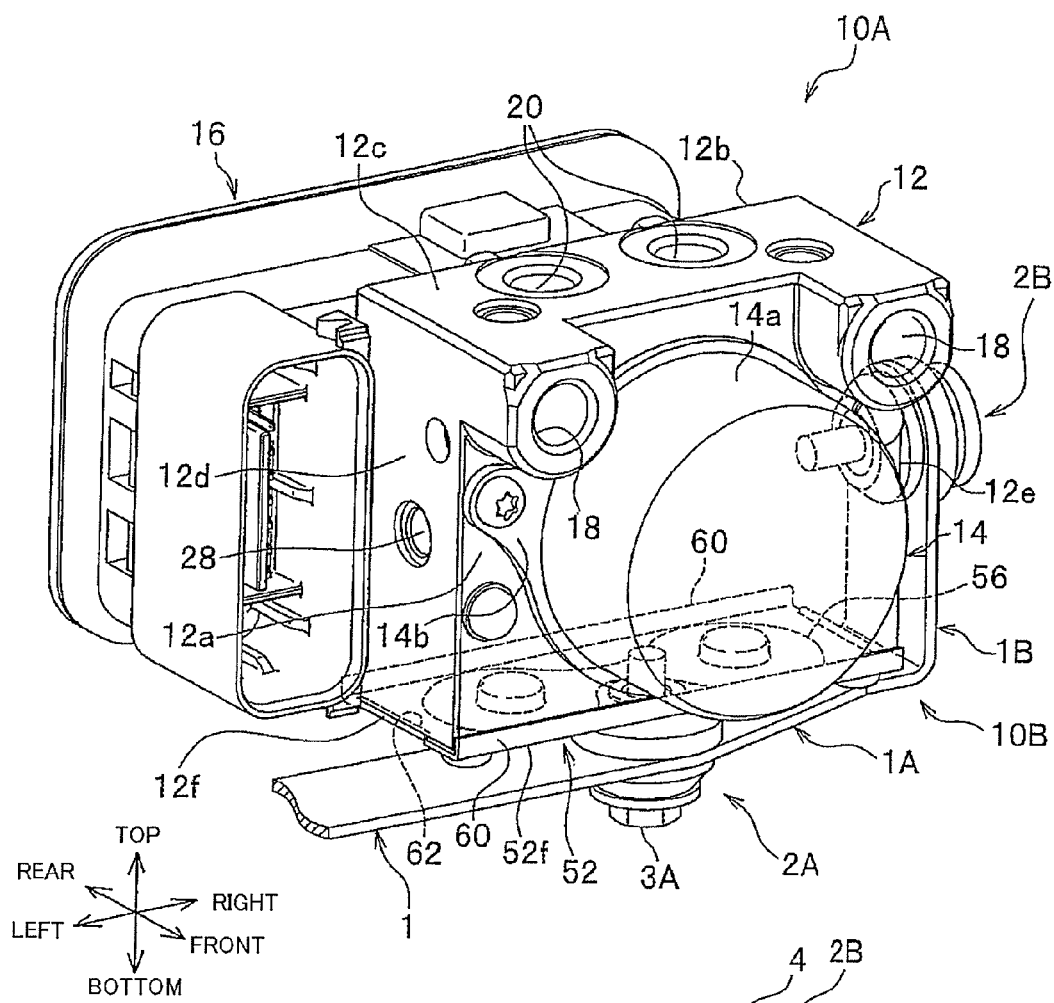
FIG. 1A is a perspective view of a vehicle brake hydraulic pressure control apparatus according to an embodiment of the invention and FIG. 1B is a perspective view showing a support device.

As shown in FIG. 1A, a vehicle brake hydraulic pressure control apparatus (hereinafter, referred to as a "brake control apparatus") according to an embodiment of the invention is preferably used for vehicles including a motorcycle, a motor tricycle, an all-terrain vehicle (ATV) and a four-wheeled motor vehicle. The brake control apparatus controls a braking force (a brake hydraulic pressure) which is given to wheels of a vehicle as required. In the following description, although the brake control apparatus will be described as being applied to a motorcycle, this is not intended to limit the type of vehicle on which the brake control apparatus is mounted.

As shown in FIG. 1A, the brake control apparatus includes a control unit 10A into which a base body 12, a motor 14 and a control housing (housing) 16 are unitized by being combined together integrally and a support device 10B which is interposed between a vehicle body (not shown, this being true hereinafter) and the control unit 10A.

The motor 14 and the control housing 16 are assembled to a front and rear of the control unit 10A with the base body 12 which incorporates various members such as electromagnetic valves interposed therebetween.

The support device 10B includes a bracket 1, and a lower mount member (a mount member) 2A and a side mount member (another mount member) 2B which are disposed on the bracket 1 so as to be fixed to the control unit 10A.

Figure 3:
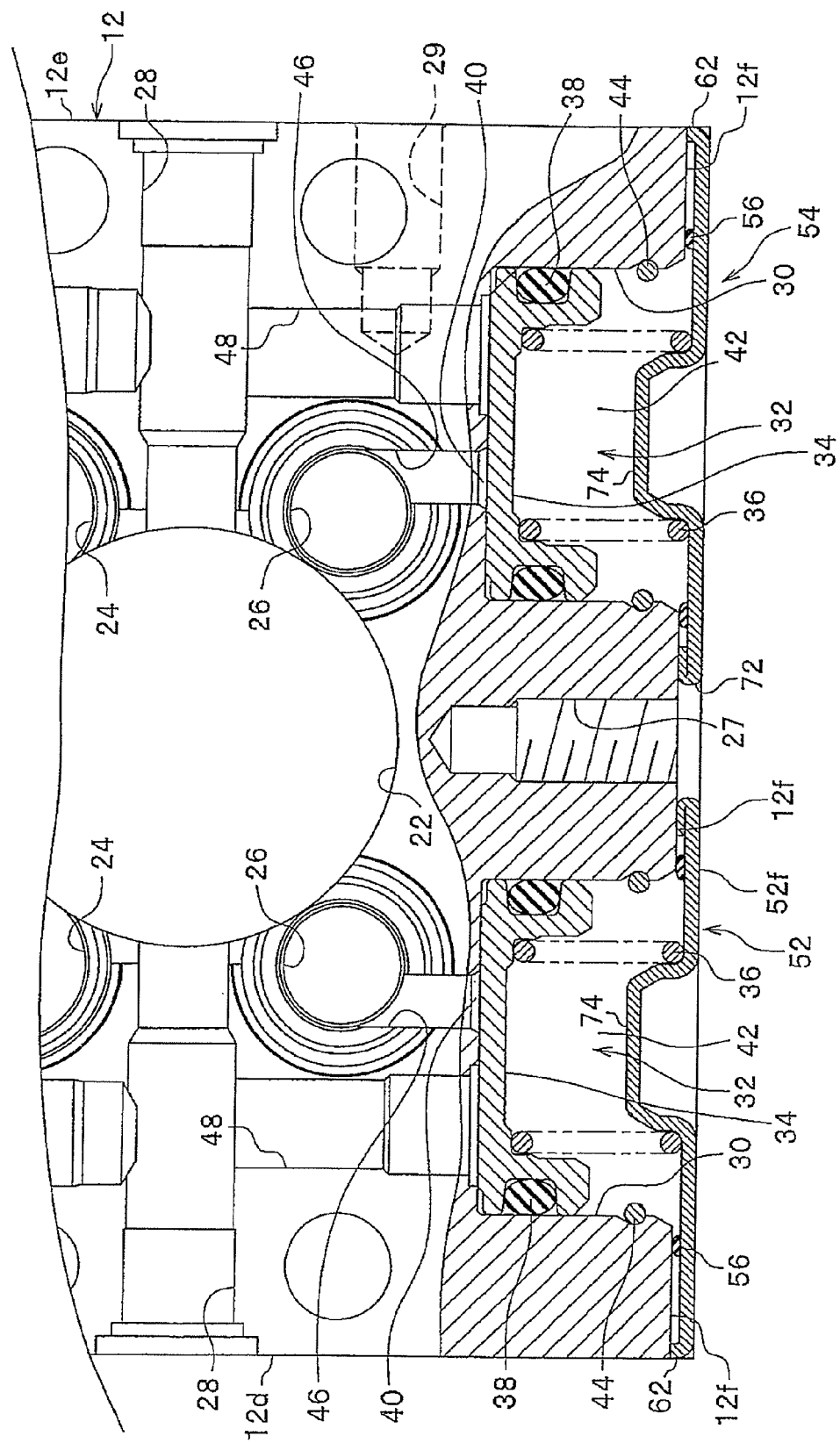
FIG. 3 is a partially sectional opened-up view which includes reservoir holes and a mounting screw hole (a lower mount member) which are provided in a base body and a partial section taken along the reservoir holes and shows an interior mechanism of the base body.

The base body 26 is made up of a metallic member having a substantially rectangular parallelepiped shape. A motor mounting hole 22 (refer to FIG. 3) in which the motor 14 is mounted is formed in a front surface 12a of the base body 12. As shown in FIG. 3, in a rear surface 12b of the base body 12, a set of inlet valve mounting holes 24, 24 is provided in parallel, and a set of outlet valve mounting holes 26, 26 is provided in parallel. A set of inlet valves, not shown, is disposed in the set of inlet valve mounting holes 24, 24, one in each hole, and the inlet valves are normally closed electromagnetic valves. A set of outlet valves, not shown, are disposed in the set of outlet valve mounting holes 26, 26, one in each hole, and the outlet valves are normally closed electromagnetic valves.

In addition, a set of pump mounting holes 28, 28 is formed in left- and right-side surfaces 12d, 12e of the base body 12, one in each surface, and a pump, not shown, is built in each of the pump mounting holes 28, 28.

Figure 6A:
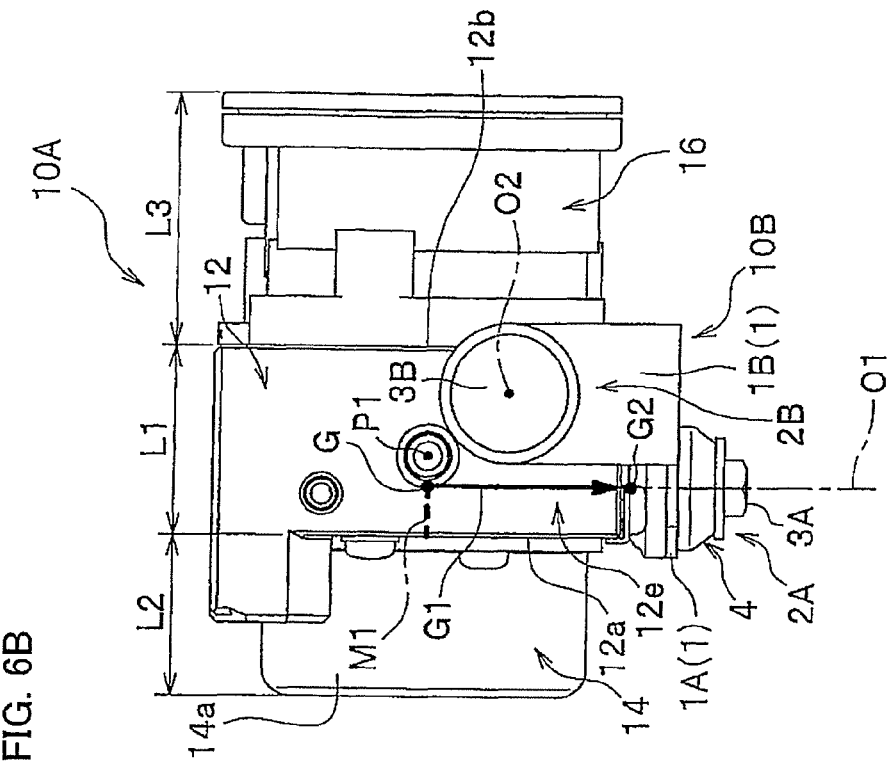
FIG. 6A is a front view of the vehicle brake hydraulic pressure control apparatus showing a center of gravity, a vertical and an intersection point.

As shown in FIG. 6A, a pump shaft P1 is disposed so as to be horizontal (parallel to a lower surface 12f of the base body 12) in a left-to-right direction of the base body 12.

Further, a fluid passage, not shown, through which brake fluid flows is formed in an interior of the base body 12.

As shown in FIG. 3, a mounting screw hole 27 is formed in the lower surface 12f of the base body 12 for fixing the lower mount member 2A. In addition, a mounting screw hole (indicated by broken lines) 29 is formed in the right-side surface 12e of the base body for fixing the side mount member 2B.

As shown in FIGS. 1A, and 5A to 5D, the motor 14 is mounted on a front surface (a motor mounting surface) 12a of the base body 12. The motor 14 includes a motor case 14a having a substantially bottomed cylindrical shape, a rotor (not shown) which is accommodated in an interior of the motor case 14a and a motor flange 14b which is placed to cover an opening portion in the motor case 14a.

A distal end portion of a motor shaft M1 (refer to FIG. 6B, this being true hereinafter), which is an output shaft of the rotor, is disposed within the base body 12 through the motor mounting hole 22 (refer to FIG. 3). The motor shaft M1 is rotatably supported by ball bearings (not shown) which are provided within the motor case 14a and on the front surface 12a of the base body 12. A ball bearing is provided at an eccentric shaft portion provided at an appropriate location on the motor shaft M1 so as to reciprocate a plunger (not shown) of a pump by pushing the plunger by an outer circumferential surface thereof as and when required.

The motor 14 is heavier than the control housing 16.

Figure 5A:
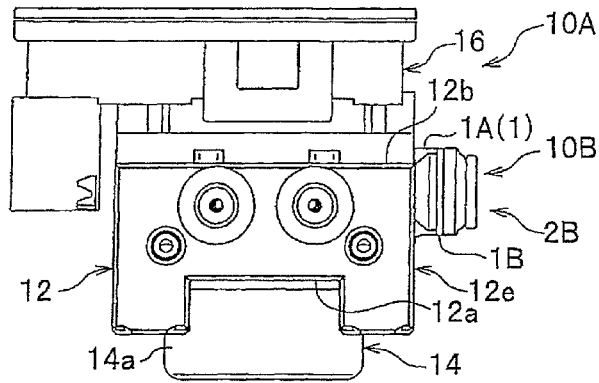
Figure 5B:
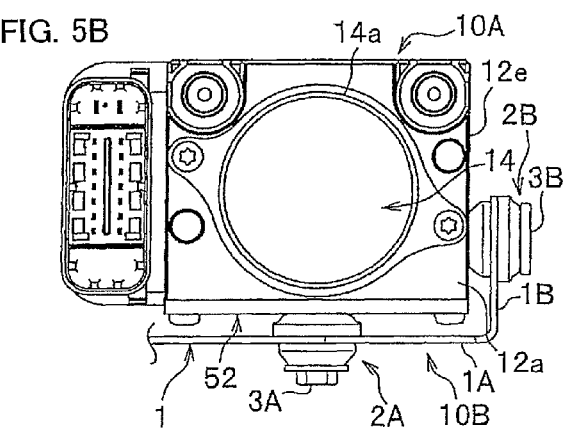
Figure 5D:
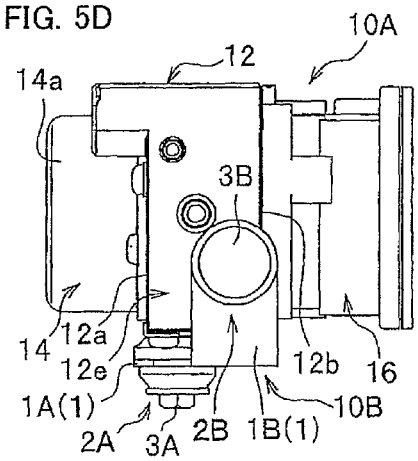
Figure 5C:
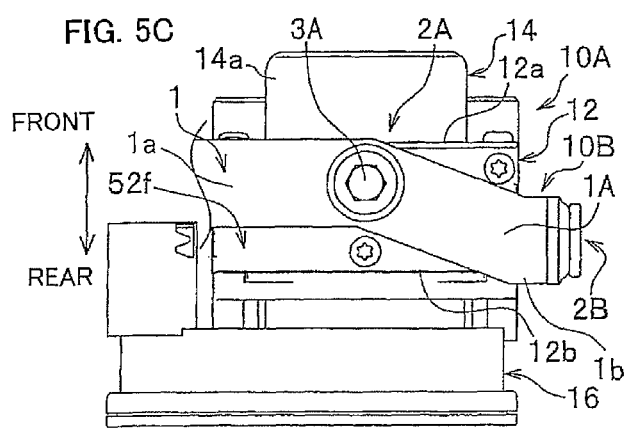
Figure 5E:
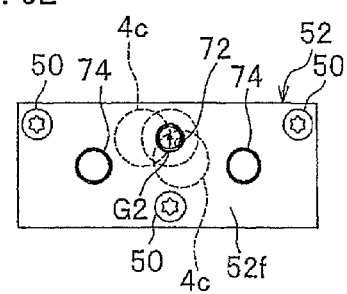

As shown in FIGS. 1A, 5A and 5C, the control housing 16 is assembled to a rear surface (a housing mounting surface) 12b of the base body 12 with a seal member (not shown). An electronic control device and electric parts, which are not shown, are accommodated in an interior of the control housing 16.

As shown in FIG. 1A, a pair of inlet ports (connection ports) 18, 18 are opened in top left- and right-side end portions of the front surface 12a of the base body 12 to which the motor is assembled. In addition, a pair of outlet ports (connection ports) 20, 20 are opened in an upper surface 12c of the base body 12.

Pipings (not shown) extended from a hydraulic pressure source such as a master cylinder, not shown, are connected to the inlet ports 18, 18 (refer to FIG. 1A), and a brake fluid is introduced thereinto from the hydraulic pressure source. In addition, the inlet ports 18, 18 are provided so as to communicate with the inlet valve mounting holes 24, 24 (refer to FIG. 3) via fluid passages, not shown.

Pipings (not shown) reaching wheel brakes are connected to the outlet ports 20, 20 (refer to FIG. 1A), and these outlet ports 20, 20 are provided so as to communicate with the inlet valve mounting holes 24, 24 (refer to FIG. 3) and the outlet valve mounting holes 26, 26 (refer to FIG. 3) via fluid passages, not shown.

As shown in FIG. 3, a pair of reservoirs 32, 32 are disposed in parallel in the left-to-right direction in a lower portion of the base body 12. The reservoirs 32, 32 have a function to temporarily hold the brake fluid which is caused to escape by flowing through communication passages which communicate with the fluid passages in the base body 12 (that is, the brake fluid which flows out from wheel cylinders of the wheel brakes) as a result of the outlet valves (the electromagnetic valves) being opened when the hydraulic pressure at the wheel brakes is controlled to be reduced.

Each having the same configuration, the pair of reservoirs 32, 32 include bottomed cylindrical reservoir holes 30, 30 which have open ends in the lower surface 12f of the base body 12, pistons 34, 34 which are displaced slidably along the reservoir holes 30, 30, and springs 36, 36 which bias the pistons 34, 34 towards the outlet valve mounting holes 26, 26 (upwards in FIG. 3).

Piston packings 38, 38 are mounted on the pistons 34, 34 with annular grooves. The reservoirs 32, 32 are divided into upper hydraulic chambers 40, 40 into which the brake fluid is introduced and gas chambers 42, 42 in which the springs 36, 36 are disposed by the piston packings 38, 38. In addition, C-type clips 44, 44 are mounted on inner circumferential surfaces of the reservoir holes 30, 30. These C-type clips 44, 44 are brought into contact with outer circumferential surfaces of lower end portions of the pistons 34, 34.

The hydraulic chambers 40, 40 are provided so as not only to communicate with the outlet valve mounting holes 26, 26 via first passages 46, 46 which extend along a top-to-bottom direction but also to communicate with the pump mounting holes 28, 28 via second passages 48, 48 which extend parallel to the first passages 46, 46.

Figure 2:
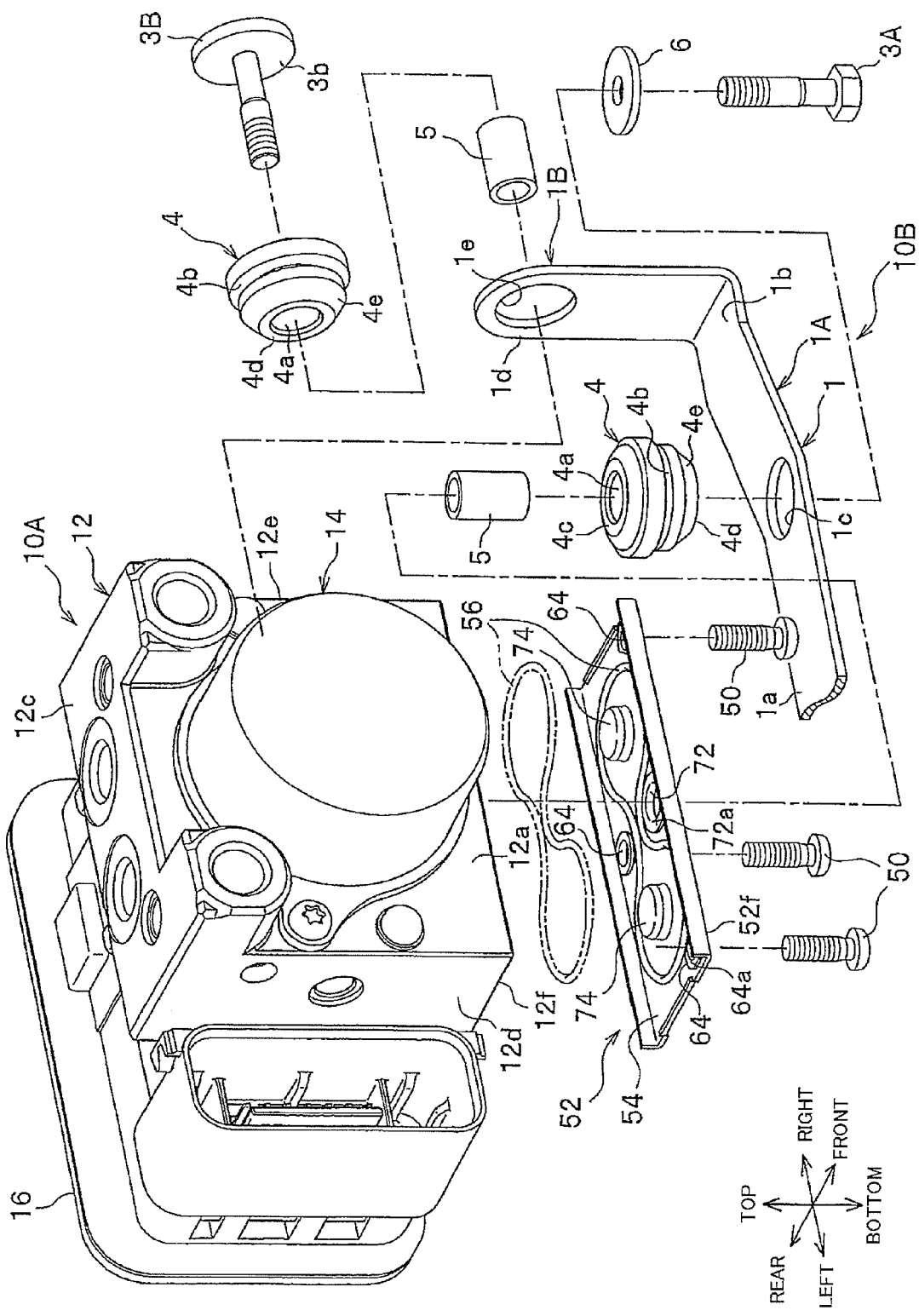
FIG. 2 is an exploded perspective view of the vehicle brake hydraulic pressure control apparatus with a lid member and the support device removed therefrom.

Further, as shown in FIG. 2, a single lid member 52 is fixed to the lower surface 12f of the base body 12 with a plurality of screw members 50 as a sealing member for sealing the plurality of reservoir holes 30, 30. Additionally, a bracket 1 is mounted on the lower surface 12f of the base body 12 with this lid member 52 with a lower mount member 2A. A mounting configuration of the lower mount member 2A and the bracket 1 will be described later.

The lid member 52 includes a plate member 54 which is a member having a plate-like shape and a seal member 56 having a ring-like shape. As shown in FIG. 3, lower end portions of the springs 36, 36 are brought into abutment with the plate member 54. The seal member 56 is interposed between the lower surface 12f of the base body 12 and an upper surface 54a of the plate member 54 as shown in FIG. 2.

In this embodiment, the lid member 52 is described as being fixed to the lower surface 12f of the base body 12. However, the invention is not limited thereto. For example, the lid member 52 may be fixed to the front surface 12a or the rear surface 12b of the base body 12. As this occurs, the reservoirs 32, 32 (the reservoir holes 30, 30) are provided in the front surface 12a or the rear surface 12b of the base body 12.

In this way, in the case of the lid member 52 being fixed to the front surface 12a or the rear surface 12b of the base body 12, the lower mount member 2A is fixed directly to the lower surface 12f of the base member 12.

Figure 4A:
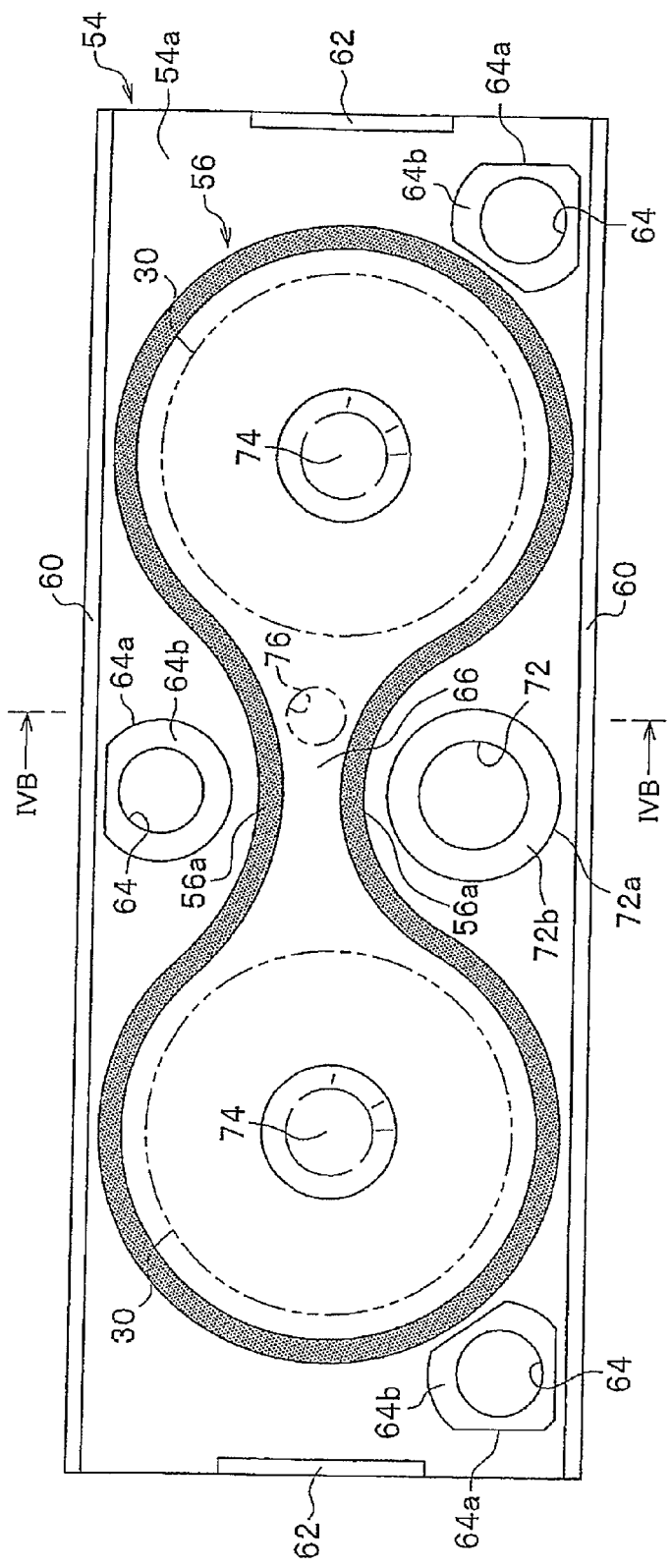
FIG. 4A is a plan view of the lid member shown in FIG. 2.

As shown in FIG. 4A, the ring-shaped seal member 56 is disposed substantially in the form of eyeglasses along the flat upper surface 54a of the plate member 54 and is then fixed to the upper surface 54a of the plate member 54 with an adhesive, for example.

This seal member 56 is formed, for example, of a metal gasket, a metal gasket coated with a rubber coating on a surface thereof, a paper gasket, an elastic member of rubber or the like, or a liquid sealer made up of a silicone-based liquid gasket. The seal member 56 is held between the lower surface 12f of the base body 12 and the upper surface 54a of the plate member 54 and exhibits a sealing function.

Figure 4B:
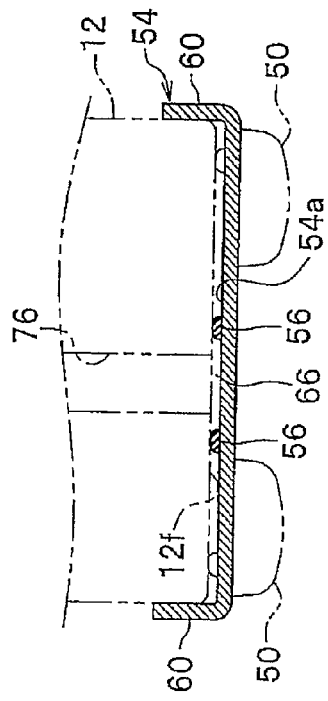
FIG. 4B is a vertical sectional view taken along the line IVB-IVB in FIG. 4A.

Here, as shown in FIG. 4B, a gap which forms a communication path 66, which will be described later, is formed between a central portion of the lower surface 12f of the base body 12 and the upper surface 54a of the plate member 54.

As shown in FIG. 4A, the plate member 54 is formed of a flat plate which exhibits a rectangular shape when viewed from thereabove. This plate member 54 has long ribs 60, 60 and short ribs 62, 62. The long ribs 60, 60 are formed by bending upwards both side edge portions of the plate member 54 which are formed of longer sides which extend lengthwise, and the short ribs 62, 62 are formed by bending upwards both axial end portions of the plate member 54 which are formed of shorter sides which extend widthwise at right angles to the lengthwise direction.

In this embodiment, the pairs of long ribs 60, 60 and short ribs 62, 62 are formed so as to face each other individually by bending both the longer sides and both the shorter sides of the rectangular plate member 54, respectively. However, one long rib 60 may be formed by bending at least either of the longer sides, and one short rib 62 may be formed by bending at least either of the shorter sides. The plate member 54 may be formed of a thin sheet of metal or a resin material.

The long ribs 60 are formed so as to cover lower end portions of the front surface 12a and the rear surface 12b of the base body 12 as shown in FIG. 1A when the plate member 54 is fixed to the lower surface 12f of the base body 12 with the plurality of screw members 50. The short ribs 62 are provided so as to be brought into abutment with the lower surface 12f of the base body 12 when the plate member 54 is fixed to the lower surface 12f of the base body 12 with the screw members 50.

Additionally, as shown in FIG. 4A, in the plate member 54, a plurality of screw holes 64 are formed in three locations including two corner portions where the long rib 60 intersects the short ribs 62 and a central location of the longer side for insertion of the screw members 50 therethrough. The plurality of screw holes 64 are disposed outside a location on the plate member 54 which is surrounded by the ring-shaped seal member 56. In addition, a communication path 66 is provided inside the location which is surrounded by the ring-shaped seal member 56, and this communication path 66 establishes a communication between the plurality of reservoir holes 30, 30.

Further, a circular through hole 72 is formed in the plate member 54 so as to penetrate therethrough to upper and lower surfaces of the plate member 54. This through hole 72 functions as a communication path communicating with a mounting screw hole 27 provided in the lower surface 12f of the base body 12 (refer to FIG. 3).

Figure 8A:
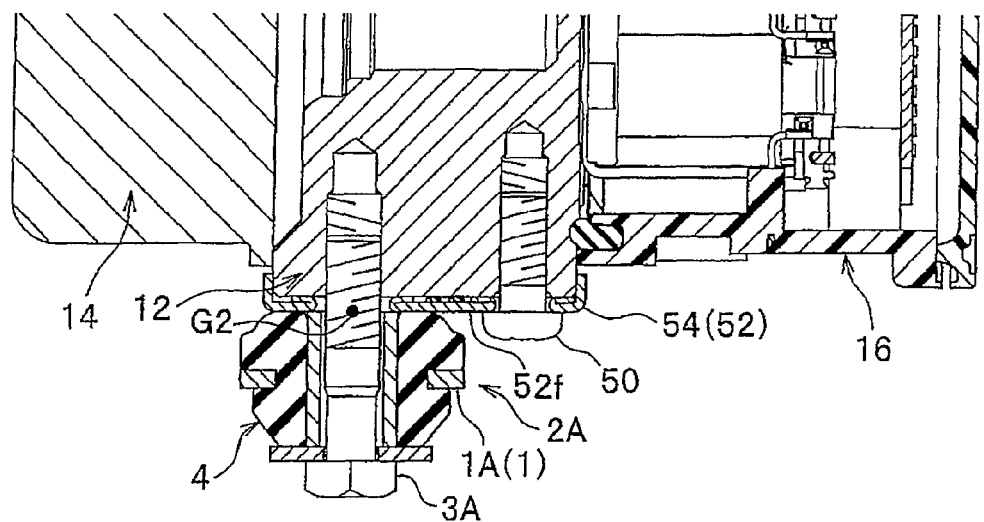
FIG. 8A is a partially omitted vertical sectional view of the vehicle brake hydraulic pressure control apparatus taken along a direction of a motor shaft.
Figure 8B:
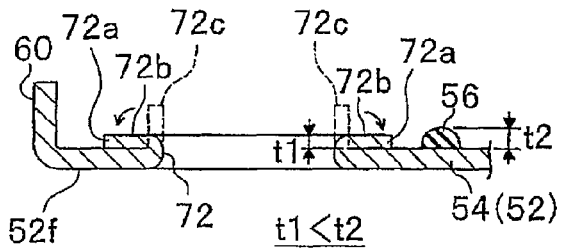
FIG. 8B is a partially omitted vertical sectional view of the lid member which shows exemplarily a through hole formed through burring.

Here, as shown in FIG. 8B, an annular frame portion 72a is provided along a peripheral portion of the through hole 72 so as to surround the through hole 72 (refer to FIG. 4A). The frame portion 72a is formed in the following manner, for example. a burring operation is performed using a punch, not shown, from a lower surface 52f side of the lid member 52 which constitutes one end of the through hole 72 so as to form a projection piece 72c (refer to broken lines) which projects substantially in a circular cylindrical fashion, and folding the projection piece 72c radially outwards using another punch so as to be closely attached to the upper surface 54a of the plate member 54.

Frame portions 64a (refer to FIG. 4A) which surround the screw holes 64 are also formed through a similar burring operation to that by which the frame portion 72a of the through hole 72 is formed.

As shown in FIG. 4A, upper surfaces of the frame portions 72a, 64a are formed into flat planes so as to function as seating faces 72b, 64b which are brought into abutment with the lower surface of the base body 12 when the plate member 54 is fixed to the lower surface 12f (refer to FIG. 3).

Figure 8C:
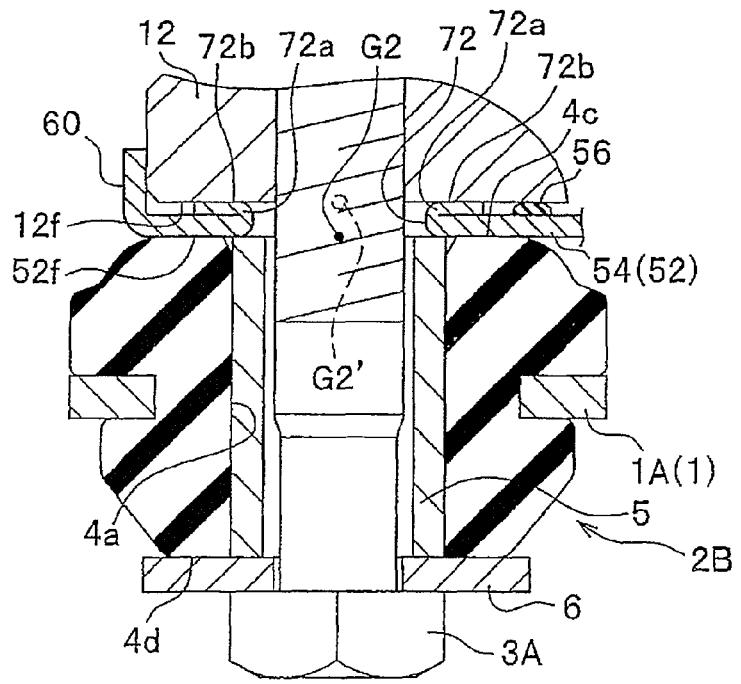
FIG. 8C is a partially omitted vertical sectional view showing a state in which the lower mount member is fixed with the lid member.

Height dimensions (upwardly projecting dimensions) of the seating faces 72b, 64b are set equal or substantially equal to a height dimension of the short rib 62. To describe this in detail by taking the case of the seating face 72b for example, as shown in FIG. 8B, the height dimensions t1 (the upwardly projecting dimensions) of the seating faces 72b, 64b are set smaller than a height dimension t2 of a sealing surface of the seal member 56 which is in an uncompressed state (t1<t2). Consequently, as shown in FIG. 8C, a screwed amount of a bolt (a screw) 3A for fixing the lower mount member 2A is limited by the abutment of the seating face 72b of the frame portion 72a with the lower surface 12f of the base body 12, whereby a compressed amount of the seal member 56 is restricted accordingly. Similarly, a screwed amount of the screw member 50 is limited by the abutment of the seating face 64b of the frame portion 64a with the lower surface 12f of the base body 12, whereby the compressed amount of the seal member 56 is restricted accordingly.

In this way, the compressed amount of the seal member 56 is designed to be reliably restricted by the seating face 72b and the seating faces 64b (refer to FIG. 4A).

As shown in FIG. 3, the mounting screw hole 27 is a screw hole which is opened to the lower surface 12f of the base body 12 and is formed between the pair of reservoirs 32, 32 which are disposed in parallel in the lower surface 12f of the base body 12. The bolt 3A (refer to FIGS. 8A, 8C) is inserted through the lower mount member 2A via the through hole 72 in the plate member 54 so as to be screwed into the mounting screw hole 27.

As shown in FIGS. 4A, 4B, the communication path 66 is formed by a space (a gap portion) which is defined in the top-to-bottom direction (the vertical direction) between a flat surface of a central portion of the lower surface 12f of the base body 12 and the flat upper surface 54a of the plate member 54 which are spaced apart in the vertical direction.

The communication path 66 configured in the way described above communicates with a vent hole (not shown) which penetrates along a lateral direction of the base body 12 via a breather hole 76 which is opened in the vicinity of the central portion of the lower surface 12f of the base body 12. This vent hole communicates with at least either of the control housing 16 and the motor 14 (in this embodiment, both the control housing 16 and the motor 14). In addition, a vent path (not shown) is formed in the base body 12 for establishing a communication between an interior and exterior of the control housing 16, and a vapor-permeable and waterproof material (a porous water proofing material, for example, a product known under the trade name of GORE-TEX), is mounted in this vent path.

By adopting this configuration, the atmospheric pressure can be held within the gas chambers 42 while reliably sealing the interiors of the reservoirs 32, 32 with the seal member 56.

Protuberant portions 74, 74 are provided on the upper surface 54a of the plate member 54. These protuberant portions 74, 74 are attached to the lower end portions of the springs 36, 36 in an engaged fashion to function as spring guides. These protuberant portions 74, 74 are formed so as not to project to a lower surface of the plate member 54 but to project towards deeper portions of the reservoir holes 30, 30.

In this embodiment, while the plate member 54 is described as being screw fastened to the lower surface 12f of the base body 12, for example, the plate member 54 may be fixed to the base body 12 by crimping the edge portions of the plate member 54. Alternatively, the plate member 54 may be press fitted in a groove portion (not shown) in the lower surface 12f of the base body 12.

Additionally, in this embodiment, while the seal member 56 is described as being positioned on the upper surface 54a of the plate member 54 so as to be bonded thereto, for example, the seal member 56 is provided so as to be held to be locked between the lower surface 12f of the base body 12 and the upper surface 54a of the plate member 54. Alternatively, a locking portion, not shown, may be provided on the upper surface 54a of the plate member 54 so as to lock the seal member 56 thereby.

Figure 6B:
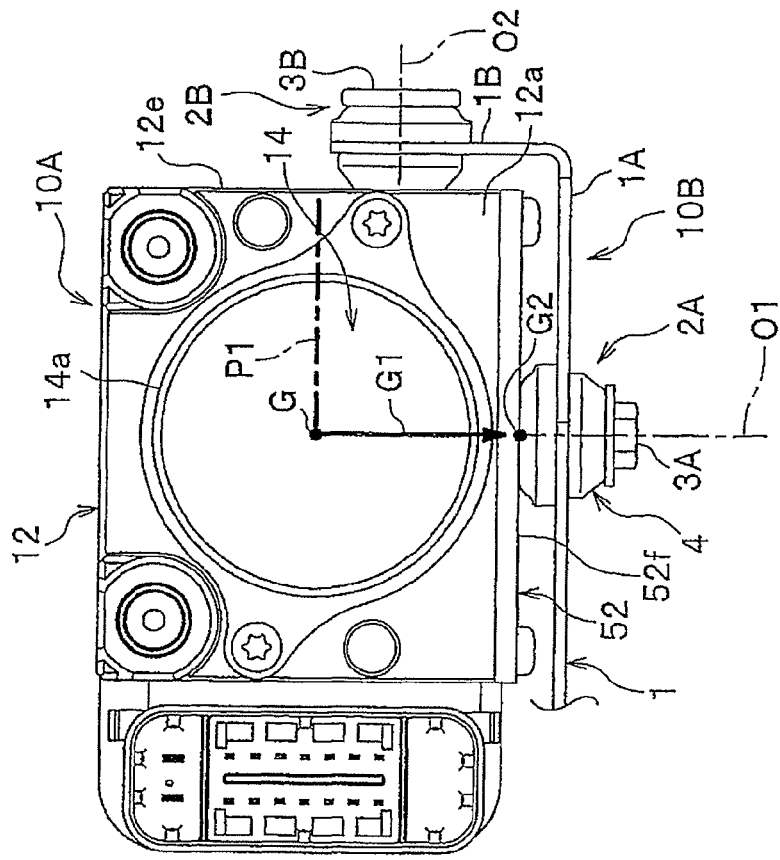
FIG. 6B is a side view of the same.

In the control unit 10A of the brake control apparatus which is configured as has been described heretofore, as is shown in FIGS. 6A and 6B, the center of gravity G of the control unit 10A is situated in the base body 12 which is held by the motor 14 and the control housing 16 therebetween.

As a configuration which enables the center of gravity G to be situated in that way, a relationship in size among the base body 12, the motor 14 and the control housing 16 which make up the control unit 10A is set as follows.

As shown in FIG. 6B, when a distance from the front surface 12a (the motor mounting surface) to the rear surface 12b (the housing mounting surface) of the base body 12 in the direction of the motor shaft M1 (the front-to-rear direction) of the motor 14 is referred to as L1, a size of the motor case 14a in the direction of the motor shaft M1 as L2 and a size (a depth) of the control housing 16 in the direction of the motor shaft M1 as L3, the relationship is set so as to realize a relation of L2<L1<L3.

Namely, in the base body 12, the distance L1 from the front surface 12a to the rear surface 12b is set larger than the size L2 of the motor case 14a in the direction of the motor shaft M1 and is set smaller than the size (the depth) L3 of the control housing 16 in the direction of the motor shaft M1, whereby the center of gravity G of the control unit 10A is situated in the base body 12.

Alternatively, a configuration may be adopted in which the center of gravity G is situated in the base body 12 by adjusting the weights of the base body 12, the motor and the control housing 16 or by adjusting the distance L1 and the sizes L2, L3 as required in addition to adjustment of the weights.

Here, the fact that the center of gravity G is situated in the base body 12 includes a case where the center of gravity G is situated in the interior of the base body 12 or the center of gravity G is situated in a space defined in the base body 12 and, in addition thereto, a case where the center of gravity G is situated on a surface of the base body 12 (for example, on the front surface 12a or the rear surface 12b, or in the inlet ports 18 which project to the front from the front surface 12a or front end faces thereof).

In this embodiment, as shown in FIGS. 6A and 6B, the front surface 12a and the rear surface 12b of the base body 12 are made parallel to a vertical line G1 which passes through the center of gravity G1 so that the vertical line G1 intersects the lower surface 12f of the base body 12. Namely, the control unit 10A (the base body 12) is fixed to a first support portion 1A(1) with the lower mount member 2A in a posture in which the front surface 12a and the rear surface 12b become substantially vertical and is then fixed to the vehicle body, not shown.

In addition, the lid member 52 is mounted on the lower surface 12f of the base body 12, and hence, a lower surface 52f of the lid member 52 substantially constitutes the lower surface of the base body 12. Therefore, an intersection point G2 between the vertical line G1 and the lower surface 12f is described as being situated on the lower surface 52f of the lid member 52 (refer to FIGS. 6A, 6B, 8A, and 8C). Consequently, in the case of the base body 12 being configured so as not to have the lid member 52, the control unit 10A (the base body 12) is fixed to the first support portion 1A(1) with the lower mount member 2A so shat an intersection point G2' is situated on the lower surface 12f of the base body 12 (refer to FIG. 8C).

The intersection point G2 may be situated in any position on the lower surface 12f of the base body 12. Thus, the control unit 10A (the base body 12) may be fixed to the vehicle body, not shown, in a posture in which the control unit 10A is inclined relative to the horizontal direction, that is, a posture in which the motor shaft M1 is inclined relative to the horizontal direction or a posture in which the pump shaft P1 is inclined relative to the horizontal direction.

Figure 1B:
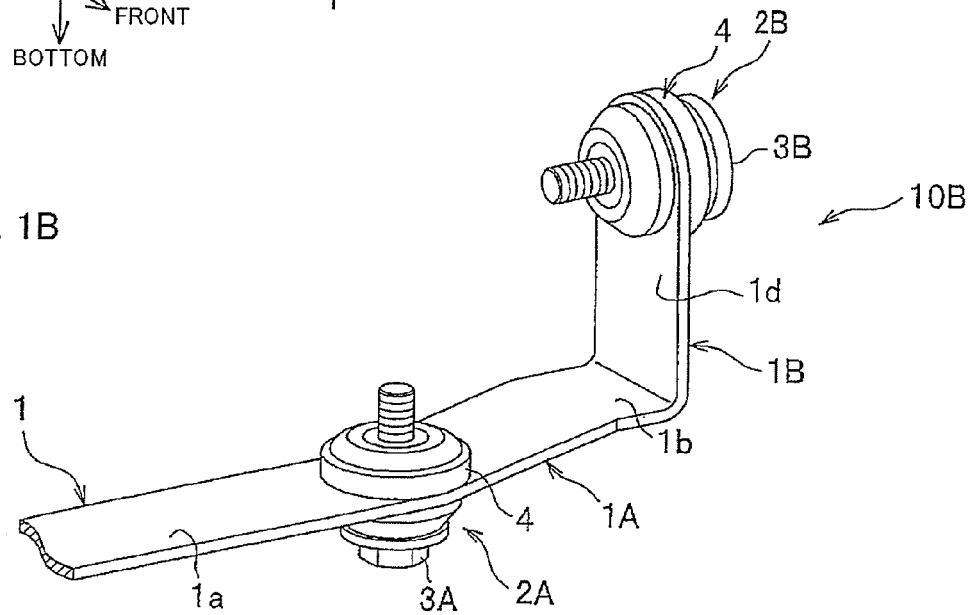

The support device 10B includes, as shown in FIG. 1B, the bracket 1, and the lower mount member 2A and the side mount member 2B which are supported by the bracket 1.

As shown in FIGS. 1A, 1B and 2, the bracket 1 is a plate-shaped member which exhibits a substantially L-shape when viewed from the front and includes the first support portion 1A which is disposed in the horizontal direction and a second support portion 1B which is provided continuously with the other end portion 1b of the first support portion 1A and which is bent at right angles to the first support portion 1A so as to be disposed in the vertical direction. Namely, the bracket 1 includes the first support portion 1A which extends along the lower surface 12f of the base body 12 and the second support portion 1B which extends along the right-side surface 12e of the base body 12.

One end portion 1a of the bracket 1 is fixed to the vehicle body, not show (or a member provided on the vehicle body). As shown in FIG. 5C, the first support portion 1A exhibits something like a V-shape when viewed from the lower surface 12a side of the base body 12. With the bracket 1 mounted on the lower surface 12f of the base body 12, the other end portion 1b is situated further rearwards of the base body 12 than the one end portion 1a. By adopting this configuration, the one end portion 1a is situated further forwards of the base body 12 than a bent portion of the first support portion 1A, and the other end portion 1b is situated further rearwards of the base body 12 than the bent portion.

As shown in FIG. 2, a support hole 1 is opened in the central portion (the bent portion) of the first support portion 1A. A rubber mount 4, which is an elastic element making up the lower mount member 2A, is fitted through the support hole 1c.

The one end portion 1a of the first support portion 1A can have an appropriate length and shape which can be changed as and when required depending on the shape of the vehicle body.

A support hole 1e is opened in a distal end portion 1d of the second support member 1B as shown in FIG. 2. A rubber mount 4, which is an elastic element making up the side mount portion 1B, is fitted through the support hole 1e.

In this embodiment, widths (widths in the front-to-rear direction) of the first support portion 1A and the second support portion 1B are made substantially the same. However, the invention is not limited thereto, and hence, the first support portion 1A and the second support portion 1B may have different widths.

The lower mount member 2A includes the grommet-shaped rubber mount 4 which can be fitted through the support hole 1c in the bracket 1, a cylindrical collar 5 which is inserted into a through hole 4a formed in a center of the rubber mount 4, the bolt 3A which is inserted through the collar 5 so as to be screwed into a female thread of the mounting screw hole 27 (refer to FIG. 3) in the base body 12, and a washer 6.

The side mount member 2B includes the rubber mount 4 which is fitted through the support hole 1e in the bracket 1, a collar 5, and a bolt 3B which is inserted through the collar 5 so as to be screwed into a female thread of a mounting screw hole 29 (refer to FIG. 3) in the base body 12.

The same rubber mounts 4 are used for the lower mount member 2A and the side mount member 2B, and therefore, the lower mount member 2A will mainly be described here.

A concave groove 4b is formed on a substantially central portion on an outer circumferential surface of the rubber mount 4 along the full circumference thereof, and this concave groove 4b fits on a circumferential edge portion of the support hole 1c (the support hole 1e in the second support portion 1B of the side mount member 2B) in the first support portion 1A.

In addition, a first flat plane 4c is formed at one end of the rubber mount 4 so as to be brought into abutment with the lower surface 52f of the lid member 52, while a second flat plane 4d is formed at the other end so as to be brought into abutment with the washer 6. The area of the first flat plane 4c is made larger than the area of the second flat plane 4d, and the control unit 10A is designed to be supported by the first flat plane 4c having the larger surface area.

The second flat plane 4d is a smaller diameter than that of the first flat plane 4c, and the washer 6 which is brought into abutment with the second flat plane 4d also has a smaller outside diameter accordingly.

In this embodiment, while the first flat plane 4c and the second flat plane 4d are described as being parallel to each other, the invention is not limited thereto, and hence, the first flat plane 4c and the second flat plane 4d may be formed inclined relative to each other.

A taper portion 4e is formed on an outer circumferential surface of the other end portion of the rubber mount 4, and this taper portion 4e reduces its diameter or tapers as it extends from a concave groove 4b side to a second flat plane 4 side thereof. By adopting this configuration, the other end portion of the rubber mount 4 can easily be inserted into the support hole 1c in the first support portion 1A.

The collar 5 which is fitted in the through hole 4a in the rubber mount 4 is formed of a hard metallic material or resin material and prevents the rubber mount 4 from being deformed more than required.

As shown in FIGS. 6A and 6B, the lower mount member 2A configured in the way described above is disposed so that an axis O1 which passes through the center of the lower mount member 2A coincides with the vertical line G1 described above.

On the other hand, the side mount member 2B is fixed to the right-side surface 12e which is adjacent to the lower surface 12f of the base member 12 from a direction which is horizontal and normal to the motor shaft M1 of the motor 14.

Here, as shown in FIG. 6B, the second support portion 1B of the bracket 1 is situated at a rear side (a side facing the control housing 16) of the right-side surface 12e of the base body 12. Thus, the side mount member 2B is designed to be fixed to the mounting screw hole 29 (refer to FIG. 3) with the bolt 3B at the rear side of the right-side surface 12e of the base body 12. Therefore, the lower mount member 2A and the side mount member 2B support the base body 12 in such a state that extensions of the axes O1, O2 which pass through the centers of the lower and side mount members 2A, 2B do not intersect each other.

Figure 7A:
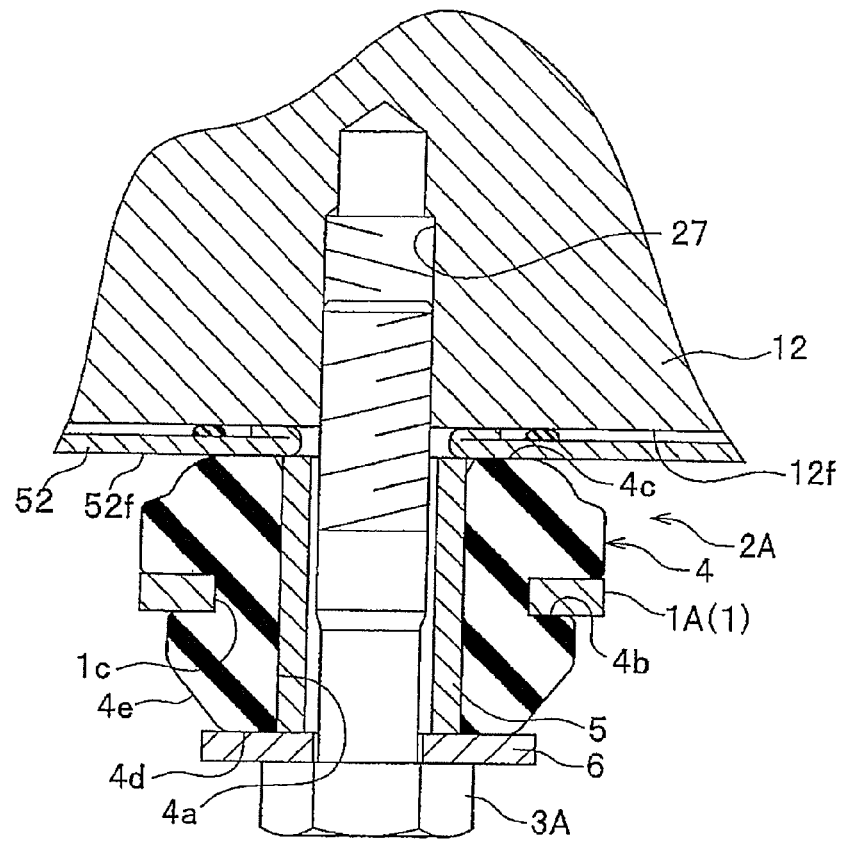
FIG. 7A is an enlarged sectional view of a lower mount member.
Figure 7B:
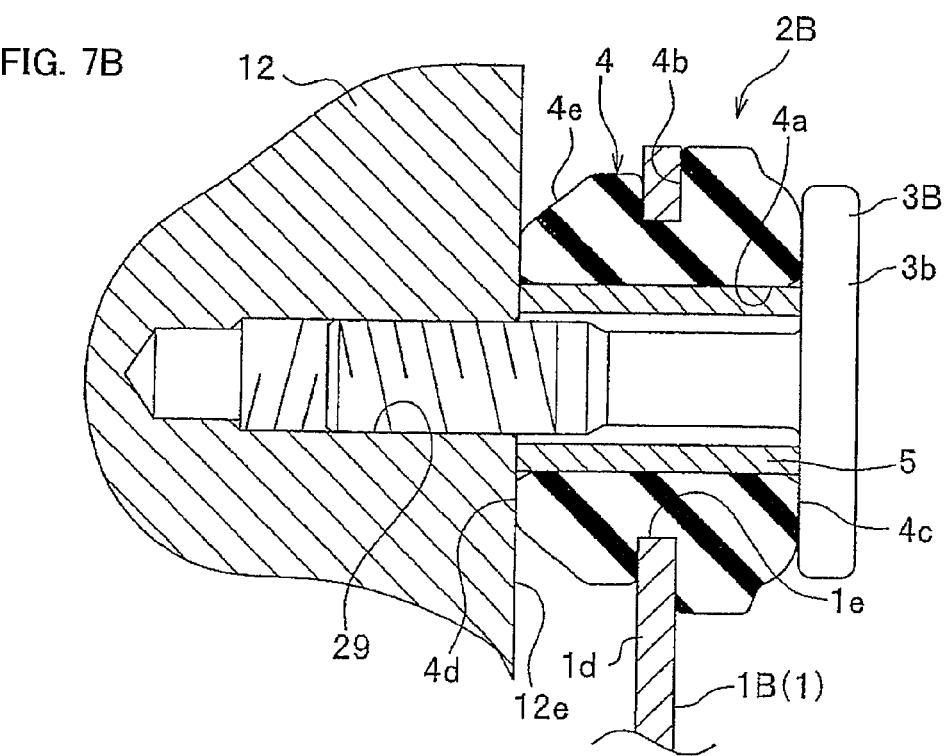
FIG. 7B is an enlarged sectional view of a side mount member.

As shown in FIG. 7B, the rubber mount 4 of the side mount member 2B is fitted through the second support portion 1B in such an orientation that a second flat plane 4d which is formed at the other end portion thereof is brought into abutment with the right-side surface 12e of the base body 12 and a first flat plane 4c which is formed at one end portion is brought into abutment with a head portion 3b of the bolt 3B.

In this way, vibrations which are generated in the lower surface 12f of the base body 12 and vibrations which are generated in the right-side surface 12e and which differ from the vibrations generated in the lower surface can be absorbed efficiently by use of the rubber mounts 4 having the same configurations.

The rubber mounts 4 may be screwed into the mounting screw holes 27, 29 formed in the base body 12 so as to be fixed to the base body 12 by inserting the bolts 3A, 3B through the corresponding through holes 4a after the rubber mounts 4 are fitted through the first support portion 1A and the second support portion 1B in advance so as to build up the support device 10B halfway as a semi-finished product. Alternatively, the rubber mounts 4 may be fixed to the mounting screw holes 27, 29 so as to be fixed to the base body 12 while the rubber mounts are being assembled to the support device 10B by being fitted through the first support portion 1A and the second support portion 1B.

Thus, according to the brake control apparatus of the embodiment that has been described heretofore, the center of gravity G of the control unit 10A is situated on the base body 12, the control unit 10A is supported by the bracket 1 so that the vertical line G1 which passes through the center of gravity G intersects the lower surface 12f of the base body 12, and the lower mount member 2A supports the base body 12 at the intersection point G2 on the lower surface 12f. Therefore, the lower mount member 2A can provide a stable support against the vibration sources such as the motor 14 which generates vibrations and the brake fluid which generates pulsation, thereby making it possible to suppress the vibration of the control unit 10A effectively.

In addition, the control unit 10A can be supported mainly by the lower mount member 2A while the vibration thereof being suppressed thereby effectively. Therefore, the shape of the bracket 1 can be simplified, thereby making it possible to realize a reduction in size of the bracket 1.

The base body 12 is configured so that the center of gravity G of the control unit 10A is situated on the base body 12 by setting the distance L1 from the front surface 12a to the rear surface 12b larger than the size L2 of the motor case 14a in the direction of the motor shaft M1 and smaller than the size L3 of the control housing 16 in the direction of the motor shaft M1. In addition, the lower mount member 2A is supported on the bracket 1 so as to be situated at the intersection point G2 between the vertical line G1 which passes through the center of gravity G and the lower surface 52f of the base body 12. Therefore, mainly, the lower mount member 2A can provide the stable support against the vibration sources such as the motor 14 which generates vibrations and the brake fluid which produces pulsation, thereby making it possible to suppress the vibration of the control unit 10A effectively.

The lower mount member 2A supports the base body 12 so that the axis O1 which passes through the center of the lower mount member 2A coincides with the vertical line G1. Therefore, the load of the control unit 10A can be reliably borne by the lower mount member 2A, whereby the lower mount member 2A can preferably support the control unit 10A while suppressing the vibration thereof effectively.

This contributes not only to the simplification of the shape of the bracket 1 but also to the reduction in size of the bracket 1.

The side mount member 2B is fixed to the right-side surface 12e of the base body 12 from the direction which is horizontal and normal to the motor shaft M1. Therefore, in the synergetic combination with the support by the lower mount member 2A, the side mount member 2B can support the control unit 10A so as to absorb vibrations in the vertical, horizontal and rotating direction of the control unit 10A, thereby making it possible to suppress the vibration of the control unit 10A effectively.

The lower mount member 2A and the side mount member 2B are fixed to the base body 12 so that the extensions of the axes O1, O2 which pass through the centers of the lower and side mount members 2A, 2B do not intersect each other (are disposed so as to be offset in the direction of the motor shaft M1). Therefore, the lower mount member 2A and the side mount member 2B can support the control unit 10A so as to absorb vibrations of the control unit 10A in a twisted direction, thereby making it possible to suppress the vibration of the control unit 10A more effectively.

The lower mount member 2A is fixed with the lid member 52, and therefore, the fixing configuration of the lower mount member 2A can be simplified. This contributes to reducing not only the number of parts but also the production costs.

The lower mount member 2A is disposed between the pair of reservoirs 32, 32 which are sealed up by the lid member 52. Therefore, the lower mount member 2A can be fixed by making effective use of the dead space in the base body 12.

The lower mount member 2A is fixed to the base body 12 at the mounting screw hole 27 provided in the base body 12 between the plurality of reservoirs 32, 32 by the bolt 3A via the through hole 72 in the lid member 52. Therefore, the lower mount member 2A can preferably be fixed via the through hole 72 in the lid member 52 while making effective use of the dead space in the base body 12. Thus, the lower mount member 2A can be mounted in the way described above while making effective use of the dead space in the base body 12, thereby making it possible to realize the simplification of the shape and reduction in size of the bracket 1.

The lower mount member 2A and the lid member 52 are fixed together by the bolt 3A, and therefore, the assemblage becomes simple. In addition, the number of parts can be reduced so as to reduce the production costs.

The plurality of reservoir holes 30, 30 can be sealed up by the single (common) lid member 52, and therefore, the number of parts can be reduced so as to reduce the production costs. As a result, in this embodiment, the lid member 52 does not project from the base body 12 further than required, which can contribute to the reduction in size of the control unit 10A. The fact that the lid member 52 does not project from the base body 12 further than required means that the lid member 52 projects from the base body 12 by a distance equal to the sum of the thickness of the plate member 54 and the height dimension of the short ribs 62, 62.

The lid member 52 is the plate-shaped member, and the seating face 72b is formed by folding the projection piece 72c which is produced by performing the burring operation from the one end (the end facing the lower surface 52f) of the through hole 72. Therefore, the lower mount member 2A can be fixed strongly and rigidly with the lid member 52 in the simple configuration, thereby making it possible to suppress the vibration of the control unit 10A more effectively.

When the plate member 54 is fixed to the base body 12, the seating faces 64b of the frame portions 64a which surround the screw holes 64 are brought into abutment with the lower surface 12f of the base body 12, whereby the compressed amount of the seal member 56 is restricted. Therefore, not only can the plate member 53 be fixed strongly and rigidly by the screw members 50, but also the seal member 56 can effectively be prevented from being deformed excessively. As a result, in this embodiment, not only can the durability of the seal member 56 be increased, but also the surface contact pressure of the sealing surface of the ring-shaped seal member 56 can be held uniformly.

In this embodiment, while the control unit 10A is supported by the bracket 1 with the lower mount member 2A and the side mount member 2B, the invention is not limited thereto. A configuration may be adopted in which only the lower mount member 2A is disposed on the first support portion 1A of the bracket 1, so that the control unit 10A is supported only by the lower mount member 2A. In this case, too, the lower mount member 2A is situated at the intersection point G2, and therefore, the control unit 10A can be supported stably only by the lower mount member 2A, thereby making it possible to suppress the vibration of the control unit 10A effectively.

As this occurs, the bracket only has to be formed as far as the position where the support hole 1c of the first support portion 1A is opened, and therefore, the shape of the bracket 1 can be simplified further, thereby making it possible to realize a further reduction in size of the bracket.

In this embodiment, while the axis O1 which passes through the center of the lower mount member 2A is described as coinciding with the vertical line G1, the invention is not limited thereto. A configuration may be adopted in which the lower mount member 2A is fixed to the base body 12 in such a state that the axis O1 and the vertical line G1 do not coincide with each other, that is, in such a state that the intersection point G2 is situated inside the outside diameter of the first flat plane 4c of the rubber mount 4. In this case, too, the lower mount member 2A is situated at the intersection point G2, and therefore, the control unit 10A can be supported stably by the lower mount member 2A which constitutes a required minimum number. In other words, the control unit 10A (the base body 12) only has to be configured so as to be supported by the bracket 1 with the lower mount member 2A in such a posture that the intersection point G2 is situated within the range defined within the outside diameter of the first flat plane 4c of the rubber mount 4.

In the embodiment, while the support device 10B is described as being fixed to the control unit 10A (the base body 12) so that the extensions of the axes O1, O2 of the lower mount member 2A and the side mount member 2B do not intersect each other, the invention is not limited thereto. A configuration may be adopted in which the support device 10B is fixed to the control unit 10A (the base body 12) so that the extensions of the axes O1, O2 intersect each other.

In the embodiment, while the side mount member 2B is described as being fixed to the right-side surface 12e of the base body 12 from the direction which is horizontal and normal to the motor shaft M1, the invention is not limited thereto. A configuration may be adopted in which the side mount member 2B is fixed to the right-side surface 12e of the base body 12 from a direction which is inclined relative to the horizontal direction or a direction which is normal to the motor shaft M1.

In the embodiment, while the brake control apparatus is described as being preferably used for the motorcycle, the invention is not limited thereto. There will be no problem even when the technical features described heretofore are applied to a brake control apparatus which is used for a four-wheeled motor vehicle.

What is claimed is:

1. A vehicle brake hydraulic pressure control apparatus comprising:
    a control unit into which a base body, a motor and a controller housing are unitized and in which the motor and the controller housing are disposed so as to hold the base body therebetween; and
    a support device interposed between a vehicle body and the control unit,
    wherein the support device has
        a lower mount member fixed to a lower surface of the base body that becomes vertical when the control unit is mounted on the vehicle body and a bracket that connects the lower mount member with the vehicle body,
    wherein a center of gravity of the control unit is situated on the base body, and
    wherein the lower mount member is supported by the bracket so as to be situated at an intersection point between a vertical line that passes through the center of gravity and the lower surface of the base body.

2. A vehicle brake hydraulic pressure control apparatus comprising:
    a control unit into which a base body, a motor and a controller housing are unitized and in which the motor and the controller housing are disposed so as to hold the base body therebetween; and
    a support device interposed between a vehicle body and the control unit,
    wherein the support device has
        a lower mount member fixed to a lower surface of the base body that becomes vertical when the control unit is mounted on the vehicle body and
        a bracket that connects the lower mount member with the vehicle body,
    wherein the base body is configured so that a center of gravity of the control unit is situated on the base body by setting a distance from a motor mounting surface to a housing mounting surface larger than a size of a motor case in a direction of a motor shaft and smaller than a size of the housing in the direction of the motor shaft, and
    wherein the lower mount member is supported by the bracket so as to be situated at an intersection point between a vertical line that passes through the center of gravity and the lower surface of the base body.

3. The vehicle brake hydraulic pressure control apparatus of claim 1,
    wherein the lower mount member supports the base body only by itself so that an axis that passes through a center of the lower mount member coincides with a vertical line that passes through the center of gravity.

4. The vehicle brake hydraulic pressure control apparatus of claim 2,
    wherein the lower mount member supports the base body only by itself so that an axis that passes through a center of the lower mount member coincides with a vertical line that passes through the center of gravity.

5. The vehicle brake hydraulic pressure control apparatus of claim 1,
    wherein the support device has a side mount member fixed to a lateral surface of the base body that is adjacent to the lower surface of the base body, and
    wherein the side mount member is fixed to the lateral surface from a direction that is horizontal and vertical to a motor shaft of the motor.

6. The vehicle brake hydraulic pressure control apparatus of claim 2,
    wherein the support device has a side mount member fixed to a lateral surface of the base body that is adjacent to the lower surface of the base body, and
    wherein the side mount member is fixed to the lateral surface from a direction that is horizontal and vertical to the motor shaft of the motor.

7. The vehicle brake hydraulic pressure control apparatus of claim 5,
    wherein the lower mount member and the side mount member are fixed to the base body so that extensions of axes which respectively pass through centers of the lower mount member and the side mount member do not intersect each other.

8. The vehicle brake hydraulic pressure control apparatus of claim 6, wherein the lower mount member and the side mount member are fixed to the base body so that extensions of axes which respectively pass through centers of the lower mount member and the side mount member do not intersect each other.

9. The vehicle brake hydraulic pressure control apparatus of claim 1,
wherein the base body has a plurality of reservoirs which are opened to the lower surface of the base body and a sealing member which seals up the plurality of reservoirs, and
wherein the lower mount member is fixed to the lower surface of the base body with the sealing member sandwiched between the lower mount member and the lower surface of the base body.

10. The vehicle brake hydraulic pressure control apparatus of claim 2,
wherein the base body has a plurality of reservoirs which are opened to the lower surface of the base body and a sealing member which seals up the plurality of reservoirs, and
wherein the lower mount member is fixed to the lower surface of the base body with the sealing member sandwiched between the lower mount member and the lower surface of the base body.

11. The vehicle brake hydraulic pressure control apparatus of claim 9,
wherein the sealing member seals up the plurality of reservoirs, and the lower mount member is disposed between the plurality of reservoirs.

12. The vehicle brake hydraulic pressure control apparatus of claim 10,
wherein the sealing member seals up the plurality of reservoirs, and the lower mount member is disposed between the plurality of reservoirs.

13. The vehicle brake hydraulic pressure control apparatus of claim 9,
wherein the sealing member and the lower mount member are fixed together with a screw that screws into a screw hole provided in the lower surface of the base body.

14. The vehicle brake hydraulic pressure control apparatus of claim 10,
wherein the sealing member and the lower mount member are fixed together with a screw that screws into a screw hole provided in the lower surface of the base body.

15. The vehicle brake hydraulic pressure control apparatus of claim 13,
wherein the sealing member is a plate-shaped member, and a through hole through which the screw is inserted is formed at a location thereon which corresponds to the screw hole, and wherein, in the through hole, a seating face is formed by folding a projection piece which is produced by performing a burring operation from one end thereof.

16. The vehicle brake hydraulic pressure control apparatus of claim 14,
wherein the sealing member is a plate-shaped member, and a through hole through which the screw is inserted is formed at a location thereon which corresponds to the screw hole, and
wherein, in the through hole, a seating face is formed by folding a projection piece which is produced by performing a burring operation from one end thereof.

17. The vehicle brake hydraulic pressure control apparatus of claim 1,
wherein the bracket is a plate-shaped member which has a substantially L-shape when viewed from a front,
wherein the bracket comprises a first support portion and a second support portion which is provided continuously with the first support portion, and
wherein the first support portion has a V-shape when viewed from a lower surface side of the base body.

18. The vehicle brake hydraulic pressure control apparatus of claim 1, wherein the lower mount member comprises:
a grommet-shaped mount fitted through a support hole in the bracket,
a cylindrical collar inserted into a through hole formed in a center of the grommet-shaped mount,
a bolt inserted through the collar so as to be screwed into a screw hole in the base body, and
a washer.

19. The vehicle brake hydraulic pressure control apparatus of claim 18, wherein the grommet-shaped mount comprises:
a concave groove formed on a substantially central portion on an outer circumferential surface of the grommet-shaped mount along a full circumference thereof,
the concave groove fitting on a circumferential edge portion of the support hole in the first support portion,
a first flat plane formed at one end of the grommet-shaped mount,
a second flat plane formed at another end of the grommet-shaped mount, and brought into abutment with the washer, and
a taper portion formed on an outer circumferential surface of the another end, which reduces its diameter or tapers as it extends from the concave groove to the second flat plane.

20. The vehicle brake hydraulic pressure control apparatus of claim 19,
wherein an area of the first flat plane is made larger than an area of the second flat plane, and
wherein the control unit is to be supported by the first flat plane having the larger surface area.

* * * * *